United States Patent [19]
Stevenson

[11] 3,913,836
[45] Oct. 21, 1975

[54] SPRAY RIG ASSEMBLY

[76] Inventor: James S. Stevenson, 4230 St. Andrews Road, Oakland, Calif. 94605

[22] Filed: May 1, 1974

[21] Appl. No.: 465,912

[52] U.S. Cl. .............................................. 239/166
[51] Int. Cl.² .......................................... B05B 1/20
[58] Field of Search ............ 239/157, 166, 167, 168

[56] References Cited
UNITED STATES PATENTS
3,545,678  12/1970  Tangeman ......................... 239/166
3,604,627   9/1971  Miscovich et al. .................. 239/166

Primary Examiner—Lloyd L. King

[57] ABSTRACT

A spray rig assembly primarily adapted for roadside spraying involves an articulated boom assembly readily mountable on a vehicle and controllable as to all its functions by the driver, using but one arm and hand, thus enabling the driver to drive the vehicle while maintaining operational control of the boom assembly. The spray rig assembly is hydraulically operated, utilizing a substantially fixed amount of the spray fluid as the power fluid, thus materially reducing equipment and costs.

7 Claims, 8 Drawing Figures

SPRAY RIG ASSEMBLY

My invention relates to spray equipment and more particularly a spray rig assembly primarily adapted for roadside spraying, and will be described with respect to such use, because of the various and complex problems involved.

With the proliferation of roads across the United States and their passage through agricultural park, city and county rights of way, the establishment and maintenance of firebreak roads through ranches, public lands, parks, etc., have created a serious problem of weed control. The use of herbicides has proven the best approach in attacking this problem.

In applying herbicides for this purpose, it has been the practice to have these chemicals applied by an individual on foot as he walks along the roadside. Frequently he might be followed by a vehicle carrying pumping equipment and associated apparatus and a reserve of the application chemicals.

It can well be appreciated that this procedure must necessarily be slow, and on highways subject to heavy traffic, the chances of accident are substantial.

Attempts to mechanize the application of herbicides to roadside spraying from a moving vehicle, have in and of themselves, serve to multiply the problems involved. one of the problems, and a major one at that, stems from the fact that along many highways and roads, one finds obstacles in the form of road side markers, signs, light standards, utility poles and the like, the presence of which necessitated the presence of a second individual on the vehicle to supervise manipulation and control of the apparatus, to avoid such obstacles.

Such mechanization, if electrically powered, provided a heavy drain on the vehicle battery, besides being relatively sluggish in operation.

The application of hydraulic power required separate and independent hydraulic circuitry, involving a tank pump and oil as the hydraulic fluid, which added considerable weight and cost to such installation.

Among the objects of my invention are:

1. To provide a novel and improved spray rig, adapted, primarily, for roadside spraying from a moving vehicle;
2. To provide a novel and improved spray rig as defined above, and which is very versatile and fast as to its ability to positionally adjust a spray head from a moving vehicle;
3. To provide a novel and improved spray rig capable of being controlled by the driver of a moving vehicle;
4. To provide a novel and improved rig capable of being controlled by use of one arm and associated hand;
5. To provide a novel and improved spray rig attachable to a mobile vehicle and capable of being controlled by the driver, while leaving the driver in full control of the vehicle; and
6. To provide a novel and improved spray rig which is hydraulically powered, yet doew not require a separate tank and pump.

Additional objects of my invention will be brought out in the following description of my invention in its preferred form taken in conjunction with the accompanying drawings, wherein, FIG. 1 is a plan view of a pray rig assembly of the present invention, in relationship to a vehicle on which it is adapted for mounting;

FIG. 3 is a view in section taken in the plane 3—3 of FIG. 2;

Figure 1:
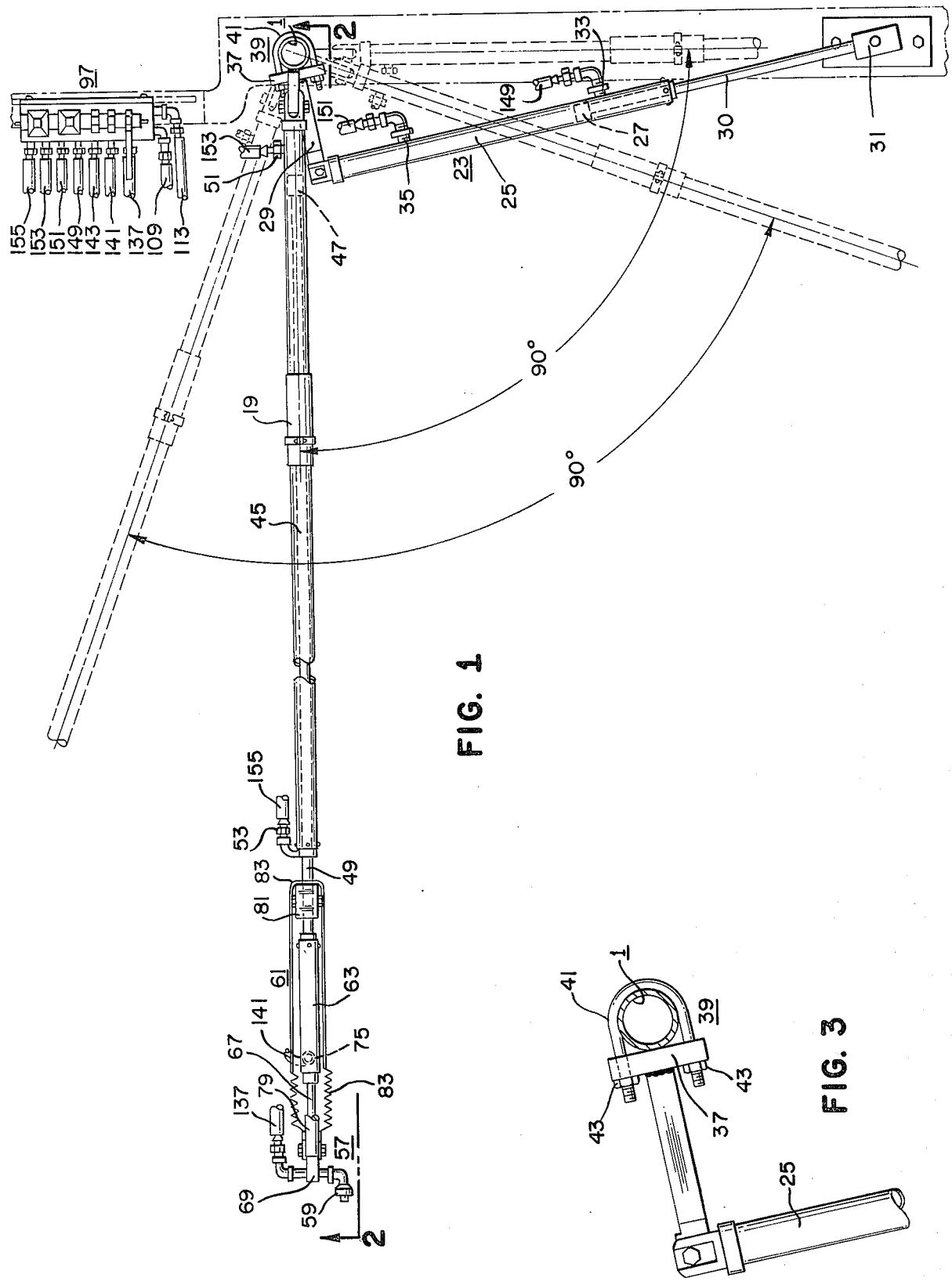
Figure 2:
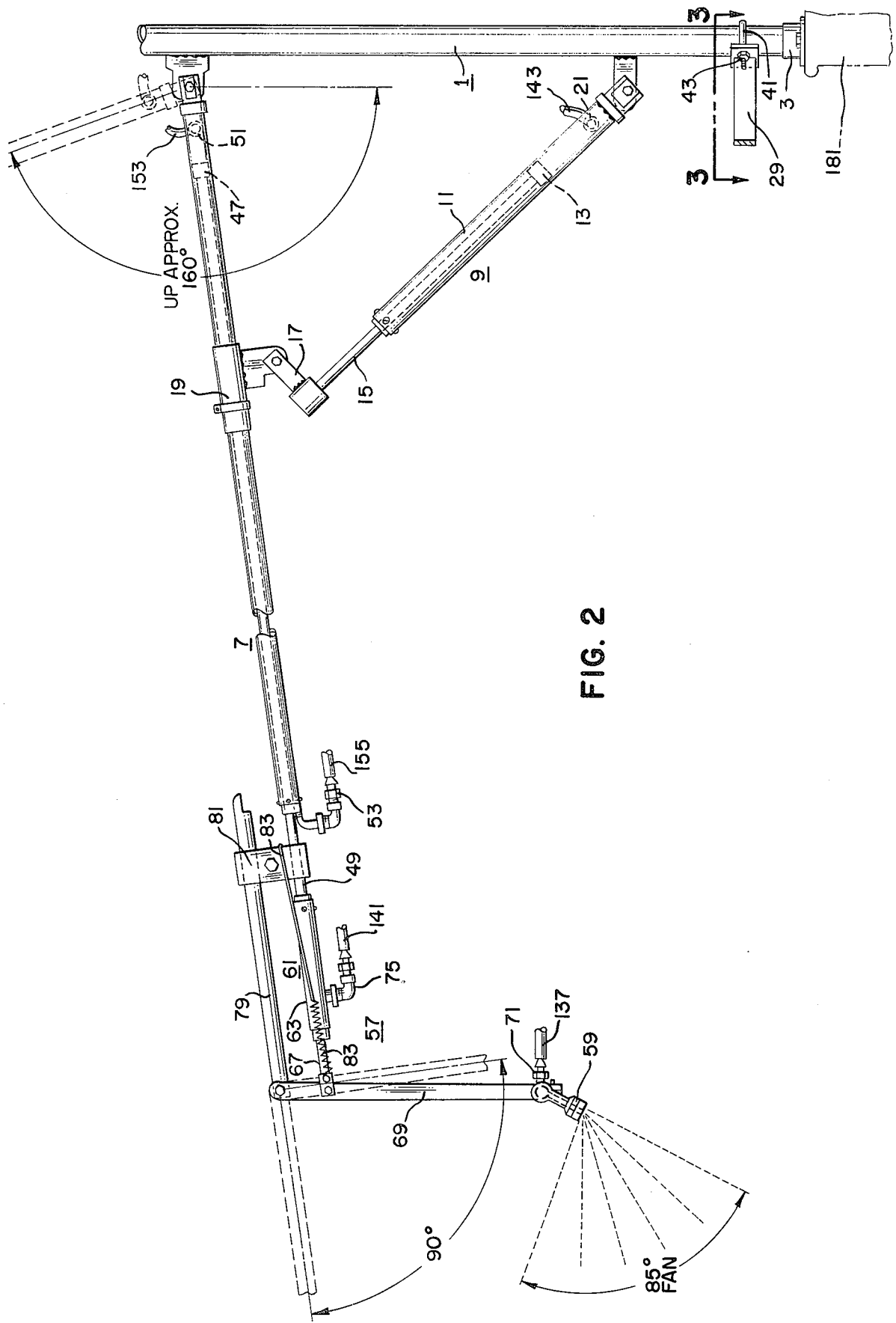
FIG. 2 is a view in elevation of the spray rig assembly of FIG. 1; as viewed in the plane 2—2 of FIG. 1.
Figure 4:
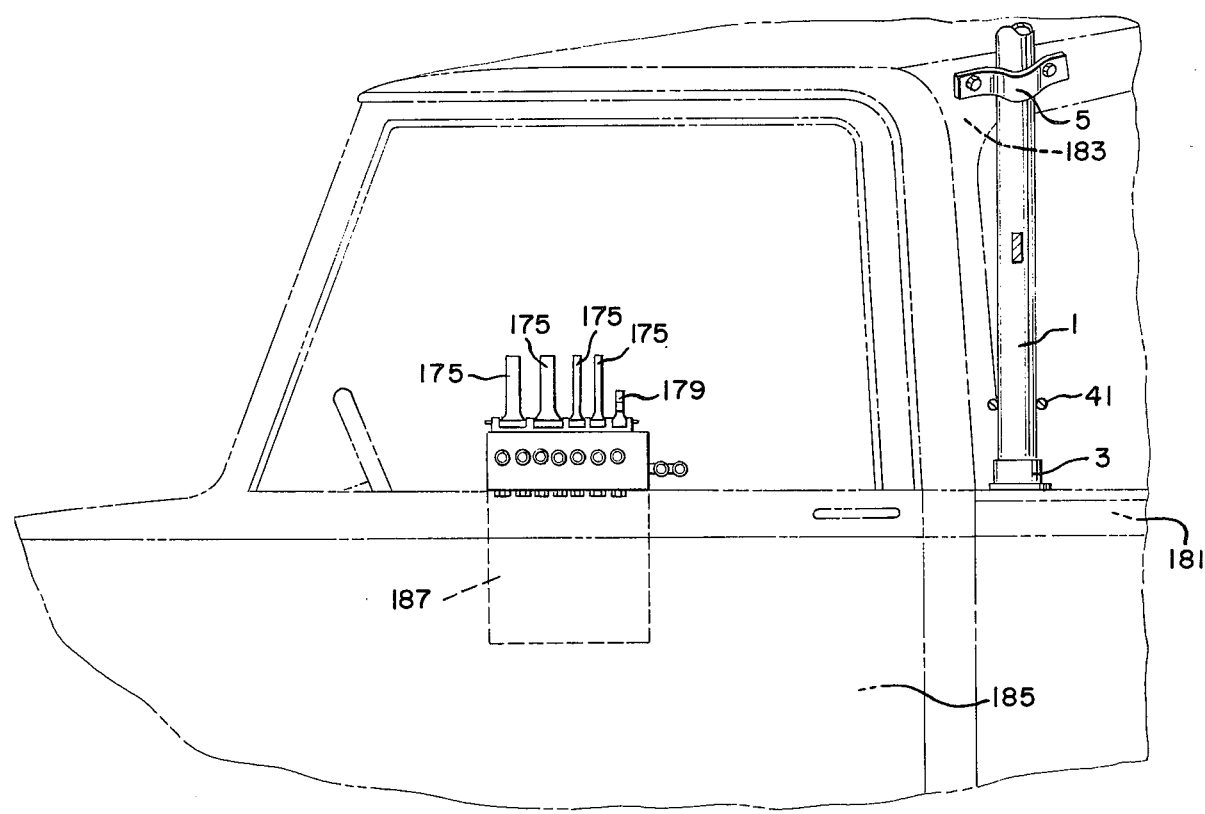
FIG. 4 is a fragmentary view in phantom of a vehicle, and depicting the manner of installation thereon, of the spray rig assembly of FIGS. 1 and 2.
Figure 8:
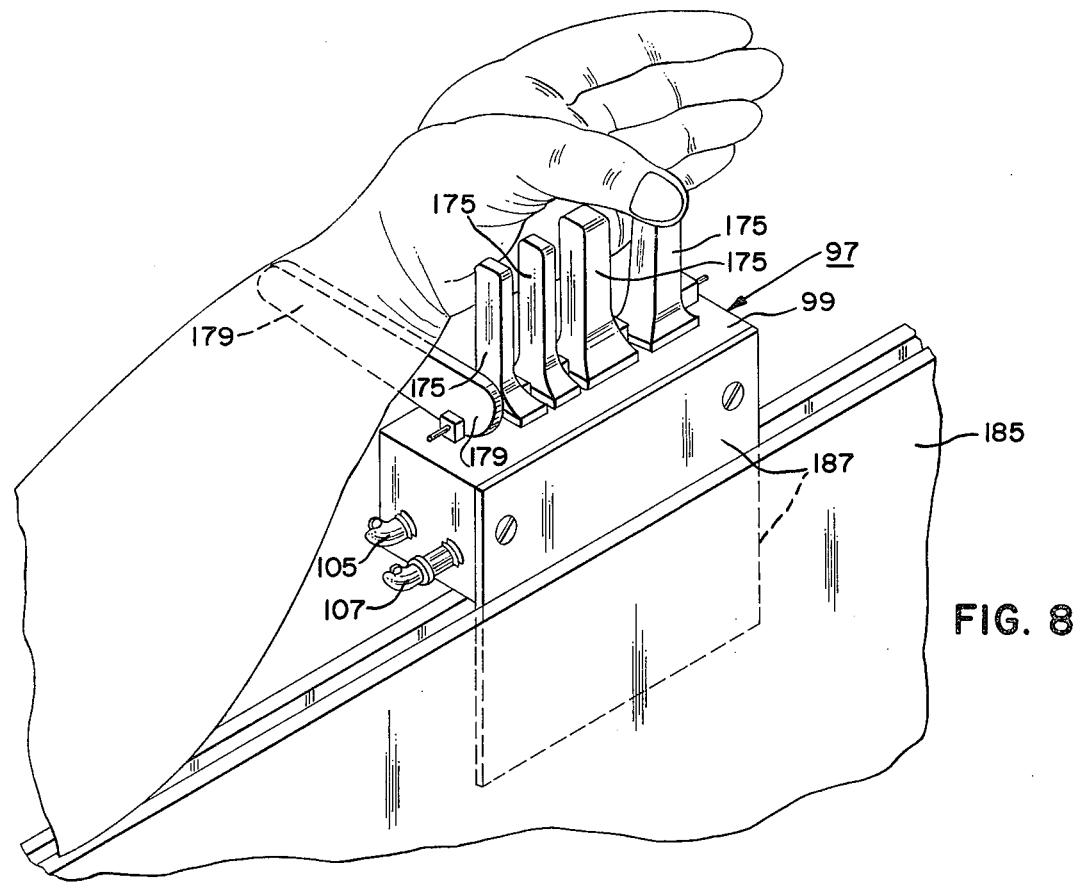
FIG. 8 is a view in perspective, of the control assembly of FIG. 5, depicting how it permits of operation with one arm and hand.
Figure 5:
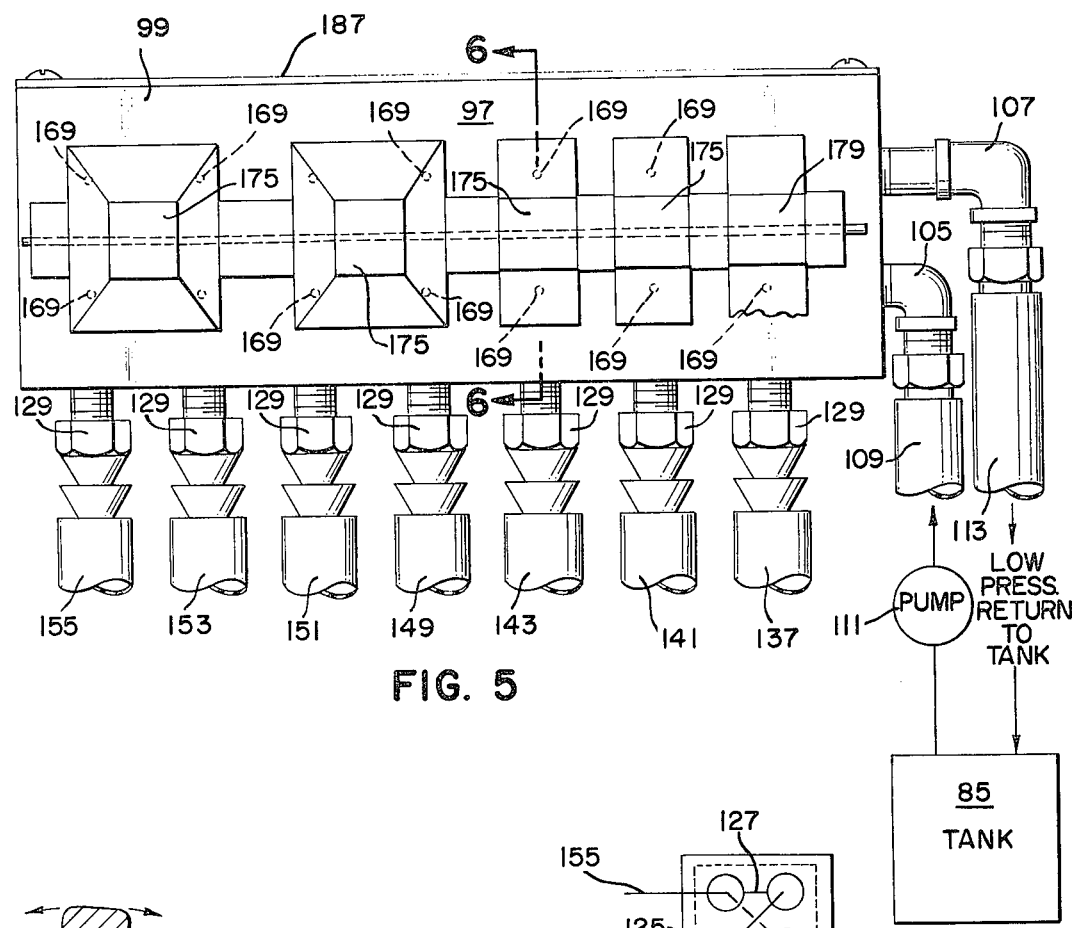
FIG. 5 is a plan view of a control assembly included in the spray rig assembly of the preceding FIGS.

Referring to the description for details of our invention in its preferred form, it involves a mast 1, rotatably installable in a flanged socket base 3 and stabilized at its upper end in a bracket 5, which permits of rotation of the mast.

A boom 7 is hingedly secured at one end to the mast adjacent its upper end, with the free end of the boom adjustable vertically by a preferably, one-way hydraulic ram involving a cylinder 11 and included piston 13, the cylinder being hingedly secured to the mast below the boom hinge, and the piston having a piston rod 15 extending from the other end of the cylinder and terminating in a bracket 17 which is hingedly secured to a collar 19 which is slidably installed on the boom. A flow coupling 21 at the lower end of the cylinder provides for driving the ram in the lifting direction, gravity being relied on to lower the boom, when desired.

Whatever the vertical adjustment of the boom might be, provision is made for swinging it through a range of adjustments horizontally, by means of a second hydraulic ram 23, preferably of the two-way type, since gravity is not involved, such ram involving a cylinder 25 with included piston 27, the cylinder being hingedly secured at one end, to one end of a moment arm 29, while the piston has a piston rod 30 extended through the other end of the cylinder, to terminate in a swivel fitting 31 for attachment to a point of anchorage. A flow coupling 33 adjacent one end of the cylinder and a flow coupling 35 adjacent the opposite end provide for two-way hydraulic actuation of the piston.

The other end of the moment arm is affixed to the clamp bar 37 of a shackle 39 of the type involving a U-shape bolt 41 threaded at both ends and spanned by the clamp bar 37 and held on by nuts 43. This permits of frictional attachment of this ram via its associated moment arm 29 to the mast 1, and as subsequently pointed out, imparts a novel and unique function in the use of the equipment, when installed on a vehicle.

The boom is in the form of a long cylinder 45 with included piston 47 having a piston rod 49 extending from the free end of the cylinder and of a length, approximately the length of the cylinder, thus enabling a maximum reach approximately twice the length of the cylinder. A flow connection 51 at one end of the cylinder and a flow connection 53 at the other end, enables two way hydraulic control of the piston and its rod, which is used as a mounting for an adjustable support assembly 57 for a spray head 59.

Such adjustable support assembly 57 involves a hydraulic ram 61 mounted on the free end of the boom piston rod 49. This ram involves a cylinder 63 into one end of which extends the boom piston rod to support this ram, the cylinder including a piston associated piston rod 67 extending from the cylinder for pivotal attachment to an intermediate point of a downwardly extending bar 69 to the lower end of which is attached the spray head 59 and an associated hose coupling 71. A flow coupling 75 to the cylinder behind the piston provides for outward swing adjustments of the rod 69 and its supported spray head from a fulcrum point at the end of a fulcrum bar 79 paralleling the cylinder below and adjustably clamped adjacent its other end in a clamp 81 affixed on the boom piston rod.

A tension spring 83 anchored under tension between this clamp and the spray head supporting bar, enables precise angular adjustment of the spray head supporting bar, and assures positive controlled lowering of the bar upon relaxation of the hydraulic power to the associated ram. All hydraulic power fluid, along with the spray material to the spray head, are supplied from a common source such as a tank 85 to their respective destinations via hose lines through appropriate control valves, all of which are centralized in a unitized control assembly 97, and this is made possible by the fact that the hydraulic power system utilizes the spray solution as the power fluid. Since the power fluid is not consumed nor expended in the operation of the hydraulic system, it represents a fixed quantity, and aside from the initial filling of the system, the use thereof in the power circuits, does not constitute a drain on the supply.

This control assembly 97 involves a valve block or housing 99 having two passageways 101, 103 formed through one end, the block being provided with hose fittings 105, 107 respectively at the exposed end of each passageway. To one fitting is coupled a hose line 109 from a pump 111 which in turn may derive its intake from the tank 85. The block passageway 101 thus associated with the pump, becomes the pressure passageway.

The remaining passageway 103 is coupled by a hoseline 113 to the tank, which will be the source of fluid from which the pump draws its supply, thus forming a closed system for hydraulic actuation of the boom assembly components.

In a plane above these passageways, are a plurality of lateral passageways 115, 117, 119, 121, 123, 125 and 127 into one side of the block, the block at the exposed end of each lateral passageway, being provided with a hose coupling fitting 129. These fittings provide couplings for the hose lines of the various hydraulic rams and spray head. To complete the various circuits, the lateral passageways 115 thru 127 must be appropriately flow connecged to the power passageway 101 and return passageway 103 previously desecribed, and suitably controlled.

For the boom assembly specifically illustrated, consideration must be given to the fact that the fluid in the spray head is not retrieved, thus requiring but one hose line 137 with no provision for fluid return, and, therefore, a single on/off valve assembly 139 will suffice for control. The ram 61 controlling the spray head supporting bar, and the vertical adjustment ram 9, each utilizes but one hose line 141, 143 respectively, for application and return of hydraulic fluid, and each then requires a set 147 of two of the single valve assemblies 139.

The horizonal adjustment ram 23 and the boom ram 7, on the other hand, each requires two hose lines 149, 151 and 153, 155 respectively, for alternate applications and return of hydraulic fluid, and each therefore, requires two sets of valve assemblies 139.

Figure 7:
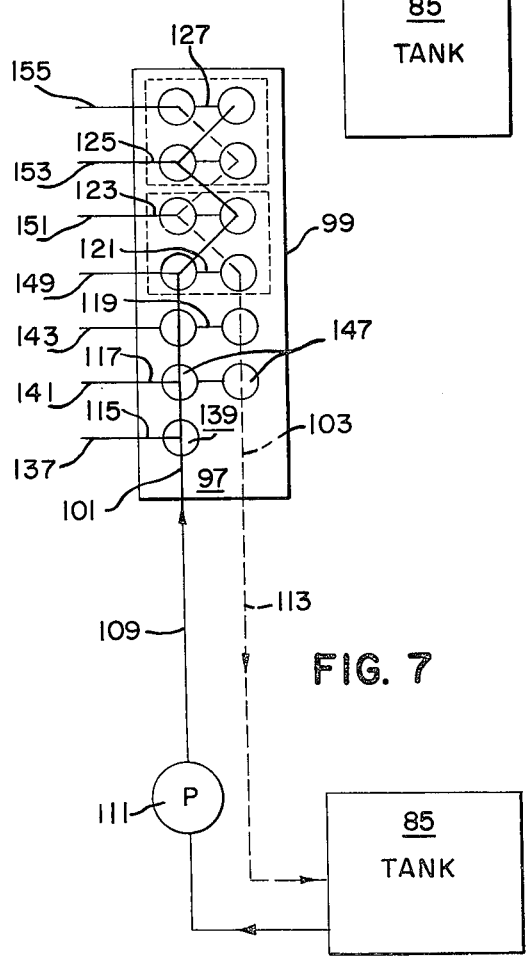
FIG. 7 is a schematic showing of valve controlled passageways in the control assembly of FIG. 5 and the manner in which the control assembly functions in enabling control of the spray rig assembly.

To structurally and funtionally accomplish the foregoing, the individual valve assemblies are located in two rows (FIG. 7). The valve assembly 139 controlling the spray head supply, being unassociated with any other valve assembly, there will be seven valve assemblies in one row and six in the second row.

Figure 6:
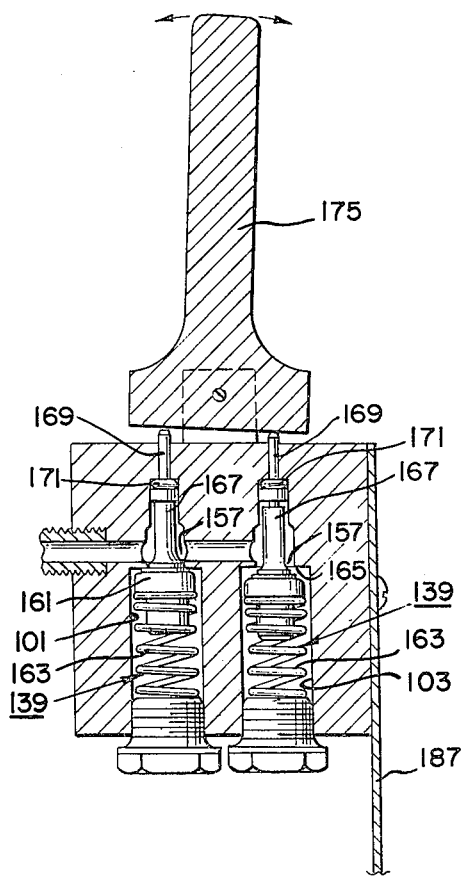
FIG. 6 is a view in section, taken in the plane 6—6 of FIG. 5.

Each valve assembly 139 (FIG. 6) controls an opening 157 from one of the main passageways 101 or 103 in the block to one of the lateral passageways, and involves a valve 161 in the associated main passageway, biased by a spring 163 to a normally closed position against a valve seat 165 about such connecting opening. The valve is provided with a valve stem 167 terminating in a pin 169 extending upward through the upper surface of the block and sealed against leakage by a sealing washer 171. Application of downward pressure to the stem will serve to open the associated valve.

The power passageway 101 may run longitudinally beneath the first four valves of the first row, including the valve which controls the spray head supply. The return passageway 103 may parallel the power passageway to the third valve in the other row, thus facilitating valve control of the pertinent components of the boom assembly and spray head supply.

Such simple relationship, however, cannot be maintained with respect to the valve assemblies associated with control of the two-way rams, as the valves of one pair must work oppositely to valves of the associated pair, to realize the flow reversal of hydraulic fluid essential in a two-way ram.

While this may be accomplished in more than one way, I prefer to make all valve assemblies alike and accomplish the desired reversal of flow by zig-zagging both the main power passage and the main return passage, to bring each below the valve which is to be exposed thereto.

Control of the valves relied on in the adjustments of the boom assembly, which includes all valves except the one controlling feed to the spray head, is made manual through use of upstanding proximate levers 175 pivotally located in alignment at the top of the block in position between the valves to alternately depress stems of each set of valves they are assigned to control when a lever is rocked from left to right vice-versa. Those which control operation of two sets of valves will necessarily have a broad enough base to accomplish this, whereas those which are to control but one set of valves, may be of similar base.

Control of the feed valve to the spray head, however, is purposely made different from the others, in that it takes the form of a lever 179 also pivotally installed in alignment with the others but which lays outwardly and almost horizontally, across the exposed end of the pertinent valve stem, the valve spring being sufficiently stiff to comfortably support the weight of one's arm in relaxed condition across this lever, but capable of responding to deliberating applied pressure. Thus, with the vertical levers 175 sufficiently close, one may control all adjustable movements of the boom assembly with one's thumb or fingers, while at the same time coordinating the dispensing of spray head through application of pressure of one's arm against the substantially horizontal lever.

This ability to control the appratus in all its functions merely through the use of one arm and associated hand, becomes of extreme importance when the apparatus is installed on a vehicle for use when such vehicle is in movement, as in roadside spraying, it being understood that such vehicle will contain the necessary equipment and supply of chemical solution, including the pump 111 and tank 85.

For application to this purpose, the mast base socket 3 may be installed on the rim 181 of the vehicle frame or body, just to the rear of the cab 183 on the driver's side. The upper end of the mast may be rotatably stabilized by the bracket 5 when affixed adjacent the proximate upper corner of the cab. The swivel attachment 31 of the horizontal adjustment ram 23 may then be anchored to the same rim of the frame or body, thus completing the installation of the boom assembly.

The unitized control assembly is made readily installable on the cab door 185 adjacent the driver, simply by affixing to a side of the block of housing 99, a thin plate 187 adapted to slip down into the narrow space between the door window and the proximate wall of the door and permit the block to rest on the window sill.

Thus, without impairing the ability of the driver to operate the vehicle, he has the ability to control all adjustments of the boom assembly and coordinate therewith the spraying of chemicals from the spray head.

While the apparatus illustrated, may be employed for purposes other than roadside spraying, as for example, such as in applying road dressings, cleaning of insulators high up on utility poles, etc., it offers particularly important advantages in overcoming problems encountered in the spraying of roadsides.

When installed on a vehicle for this purpose, the boom is normally high above ground, and the adjustments may be such as to allow the spray head to function just above ground in a level position attitude, to a near vertical position of the boom. Thus the boom, while carrying the spray head at its lowest position, can ride above many of the obstacles such as road signs, shrubs... etc., which one might otherwise encounter and which would necessitate either manipulation of the equipment or maneuvering of the vehicle to circumvent, or in its near vertical position, the spray head, with a boom extendible to around say 18 feet, can be elevated to a height of around 26 feet, assuming the boom to be hinged to the mast at an elevation of 8 feet. These figures of course, may vary.

Should a utility pole be approached, the boom itself may be elevated to its substantially vertical position to by-pass such pole without the necessity of changing the course of the vehicle, to avoid impact.

Aside from the problems presented by such obstacles, the controls provide for rapid adjustments to accommodate the spray head to changes in topography and width of roadside. This is extremely important in apparatus for this purpose, as the topography may change rather rapidly from a sharp downgrade to a steep upslope, or the roadside shoulder might vary widely and sharply as to width. The ability to rapidly make the necessary adjustments in the equipment and without necessarily altering the speed of the vehicle, enables the driver to devote a greater portion of his attention to spray aspect of his work.

Adding to the multirange adjustability of the boom assembly, is the frictional clamping of the horizontal adjusting ram 23 to the base of the mast. While the boom may normally lie in the plane of the vehicle side wall when not in use, and from which position it might be adjusted through an angle of say 90° to be at right angles to the cab door and within view of the driver, it is conceivable that it might be desirable to bring the spray head closer to the vehicle than permitted by the boom in its outward position, and still be within clear view of the driver. Any angle less that the 90° from normal stored position of the boom, might render this difficult, without requiring the driver to look back and thus divert his complete attention from the highway ahead. This would be highly undesirable. However, if he could advance the boom beyond the 90° right angle position with respect to the cab door, this would swing the spray head closer to the path of the vehicle and maintain it within good view of the driver.

This he can realize merely by manually swinging the boom outward from its normally stored position, through an angle comparable to the angle of advance he desires beyond the right angle position depicted in the drawings. With this as a new starting position, the horizontal adjustment ram will enable as much as an additional 90° in horizontal adjustment of the boom, which will bring the spray head closer to the path of the travel of the vehicle, and within easy view of the driver.

For roadside spraying, the spray head should preferably be of the off-center spray type capable of emitting a spray pattern which allows from approximately 18 inches to a spread of 20 feet, by adjusting the output of the pump, and regulating the speed of the vehicle to achieve a regular gallon per acre output.

From the foregoing description of my invention in its preferred form, it will be apparent that the same is subject to alteration and modification without departing from the underlying principles involved, and I accordingly do not desire to be limited in my protection to the specific details illustrated and described except as may be necessitated by the appended claims.

I claim:

1. A spray rig adapted primarily for roadside spraying from a moving vehicle, comprising an articulated boom assembly mountable on such vehicle within view of an operator on such vehicle, said boom assembly including a boom and a plurality of hydraulic boom position adjusting means coupled to said boom, each boom position adjusting means determining a different range of positions of said boom with respect to surfaces to be sprayed, a spray head assembly, means mounting said spray head assembly at the end of said boom, a source of spray solution, and means for conveying spray solution from said source and delivering it under pressure to both said spray head assembly, and said hydraulic boom position adjusting means, whereby said spray solution is utilized as the hydraulic fluid in said hydraulic boom position adjusting means, thereby eliminating the need for a second power source.

2. A spray rig in accordance with claim 1, characterized by said hydraulically actuable position adjusting means, each including a cylinder and a piston in said cylinder having a piston rod extending through an end of said cylinder, certain of said position adjusting means having but a single hose line flow-coupled to said cylinder in proximity to an end thereof and others of said position adjusting means having a pair of hose lines flow-coupled to said cylinder, each adjacent a different end thereof, said means for feeding spray solution from said source to said spray head assembly including a hose line and a pump, a control valve in the flow path of said hose line, said means for controlling power to said position adjusting means, each including a valve in the flow path of each of said hose lines to a boom position adjusting means, and said means for assembling all of said control means within convenient reach of an operator on such vehicle, including a housing with said control means installed therein, means coupling each of said hose lines to said housing, means providing a flow passageway from one side of each of said position adjusting means control valves to a different one of said hose lines leading to said position adjusting means, manually actuable means for each of said positioning control valves for selectively actuating said valves to control said plurality of position adjusting means, means for actuating said spray head feed control valve, said actuating means being located in sufficient proximity to said manually actuable means to permit control by arm pressure while said manually means are within reach of the fingers associated with said arm.

3. A spray rig in accordance with claim 2, characterized by a flow-line from said spray solution supply source to said housing and including said pump, and a flow passageway in said housing flow connecting said flow line to one side of said spray solution feed control valve, and said means for supplying hydraulic power for siad position adjusting means including flow passage means connecting the discharge side of said same pump to each valve of said various position adjusting means.

4. A spray rig in accordance with claim 1, characterized by means for adjusting the length of said boom, said means including means for controlling said boom length adjusting means, said boom length control means being included with said boom position adjusting control means in said unitary assembly.

5. A spray rig in accordance with claim 4, characterized by each of said manually actuable means including a substantially vertical lever for each of said position adjusting means control valves, and said arm actuable means for said spray head feed valve including a substantially horizontal lever so located with respect to said vertical levers that when said arm is resting on said subtantially horizontal lever, said vertical levers are within reach of the fingers of the hand associated with said arm.

6. A spray rig in accordance with claim 1, characterized by said spray solution being of the herbicide type.

7. A spray rig adapted primarily for roadside spraying from a moving vehicle, comprising an articulated boom assembly mountable on such vehicle within view of an operator on such vehicle, said boom assembly including a boom and a plurality of boom position adjusting means coupled to said boom, each boom position adjusting means determining a different range of positions of said boom with respect to surfaces to by sprayed, means for supplying power to each of said plurality of boom position adjusting means, means for controlling application of power from said power supply means to each of said position adjusting means, a spray head assembly, means adjustably mounting said spray head assembly at the end of said boom, a source of spray solution, means for conveying spray solution from said source and delivering it under pressure to said spray head assembly, means for controlling flow of spray solution to said spray head assembly and said boom position adjusting means, and means for assembling all of said control means in a unitary assembly within convenient reach of such operator, said means for assembling all of said control means within convenient reach of an operator on such vehicle, including a housing with said control means therein, and a plate affixed to a wall of said housing and extending beyond the bottom thereof, said plate being sufficiently thin to enable insertion thereof into the window slot of a door on such vehicle, to permit removable installation of said housing and included control means on the window sill of such door within convenient reach of an operator occupying a seat adjacent such door.

* * * * *